(12) United States Patent
Yoshizawa

(10) Patent No.: US 9,741,251 B2
(45) Date of Patent: Aug. 22, 2017

(54) COLLISION AVOIDANCE ASSISTANCE DEVICE AND COLLISION AVOIDANCE ASSISTANCE METHOD

(71) Applicant: TOYOTA JIDOSHA KABUSHIKI KAISHA, Toyota-shi, Aichi-ken (JP)

(72) Inventor: Shintaro Yoshizawa, Gotemba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/110,782

(22) PCT Filed: Feb. 17, 2014

(86) PCT No.: PCT/JP2014/053650
§ 371 (c)(1),
(2) Date: Jul. 11, 2016

(87) PCT Pub. No.: WO2015/122017
PCT Pub. Date: Aug. 20, 2015

(65) Prior Publication Data
US 2016/0328974 A1    Nov. 10, 2016

(51) Int. Cl.
*G08G 1/16* (2006.01)
*B60W 30/08* (2012.01)
*B60W 30/09* (2012.01)

(52) U.S. Cl.
CPC .......... *G08G 1/166* (2013.01); *B60W 30/08* (2013.01); *B60W 30/09* (2013.01)

(58) Field of Classification Search
CPC ....... G08G 1/166; B60W 30/08; B60W 30/09
See application file for complete search history.

(56) References Cited

U.S. PATENT DOCUMENTS

| 5,923,132 A * | 7/1999 | Boyer | G05B 19/40931 318/34 |
| 2002/0121981 A1 * | 9/2002 | Munch | G08B 21/06 340/576 |
| 2010/0106387 A1 | 4/2010 | Tsuchida | |

(Continued)

FOREIGN PATENT DOCUMENTS

| JP | 2008-308024 A | 12/2008 |
| WO | 2013/030903 A1 | 3/2013 |
| WO | 2014/073080 A1 | 5/2014 |

*Primary Examiner* — Behrang Badii
*Assistant Examiner* — Daniel L Greene
(74) *Attorney, Agent, or Firm* — Sughrue Mion, PLLC

(57) ABSTRACT

A collision avoidance assistance device includes an object detection unit configured to detect the object, a planned execution timing determination unit configured to determine a planned execution timing, a motion characteristics value acquisition unit configured to acquire a motion characteristics value in a comparison target time span which is a predetermined time span later than a detection timing at which the object detection unit detects the object and prior to the planned execution timing, and a collision avoidance assistance determination unit configured to determine whether or not to execute the collision avoidance assistance at the timing prior to the planned execution timing, based on the result of comparison between the motion characteristics value and a reference motion characteristics value in the comparison target time span obtainable from a history of the past motion characteristics values.

7 Claims, 11 Drawing Sheets

(56) References Cited

U.S. PATENT DOCUMENTS

| | | | |
|---|---|---|---|
| 2010/0198478 A1* | 8/2010 | Shin | B60W 10/06 |
| | | | 701/96 |
| 2013/0041576 A1* | 2/2013 | Switkes | G08G 1/166 |
| | | | 701/123 |
| 2014/0222326 A1 | 8/2014 | Sato et al. | |
| 2015/0336579 A1 | 11/2015 | Yoshizawa et al. | |

* cited by examiner

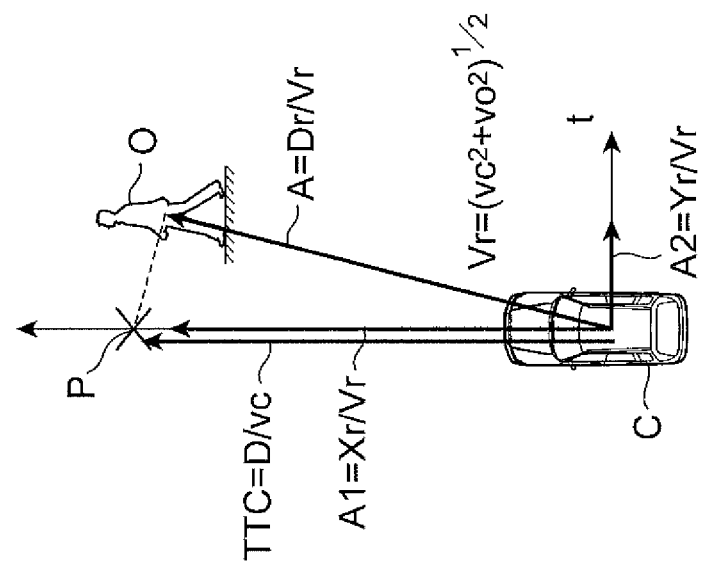
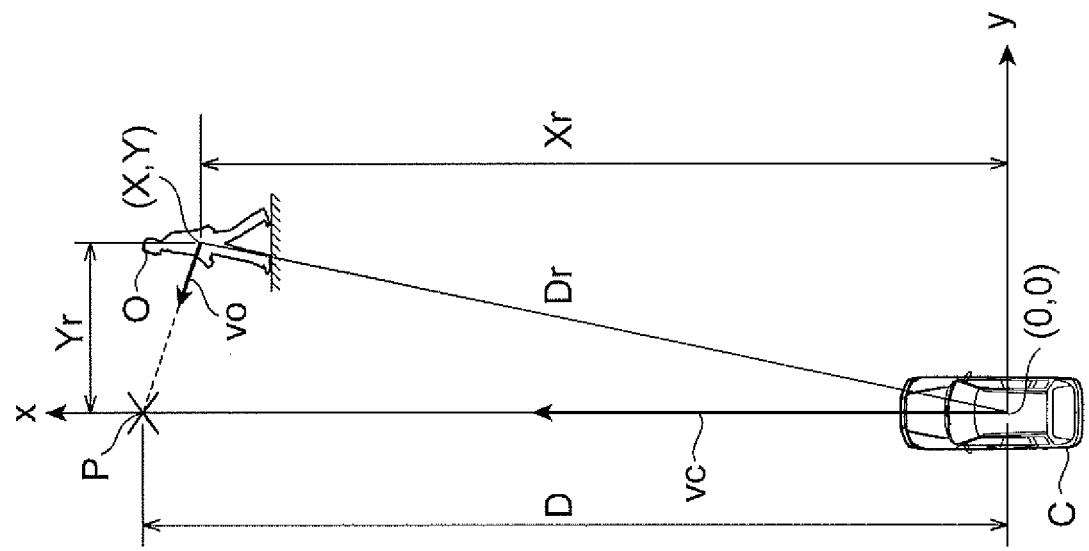
Fig. 4

COLLISION AVOIDANCE ASSISTANCE DEVICE AND COLLISION AVOIDANCE ASSISTANCE METHOD

CROSS REFERENCE TO RELATED APPLICATIONS

This is a National Stage of International Application No. PCT/JP2014/053650 filed Feb. 17, 2014, the contents of which are incorporated herein by reference in its entirety.

TECHNICAL FIELD

The present invention relates to a collision avoidance assistance device and a collision avoidance assistance method for avoiding a collision of a vehicle with an obstacle or the like.

BACKGROUND ART

In the related art, a collision avoidance assistance device for preventing a collision of a vehicle with an obstacle during driving of the vehicle has been developed. For example, in Patent Literature 1, a technology is disclosed, in which a possibility of a collision between an object detected by object detection means and a vehicle is determined for each discrete time, and collision avoidance assistance such as braking assistance is performed according to a result of calculating the possibility of collision which is based on a time to collision (TTC: a time until arrival at the obstacle).

CITATION LIST

Patent Literature

[Patent Literature 1] Japanese Unexamined Patent Publication No. 2008-308024
[Patent Literature 2] International Publication No. 2013-030903

SUMMARY OF INVENTION

Technical Problem

Incidentally, in order for a vehicle to actually avoid a collision with a detected object using the collision avoidance assistance, it is desirable to perform the collision avoidance assistance in an earlier timing. However, in order to make the execution timing of the collision avoidance assistance be earlier, it is necessary to make the timing for determination of whether or not to execute the collision avoidance assistance be earlier. Therefore, there is a problem in that unnecessary collision avoidance assistance may be generated.

Therefore, an aspect of the present invention has an object to provide a collision avoidance assistance device and a collision avoidance assistance method that can perform collision avoidance assistance in the earlier execution timing while suppressing the generation of the unnecessary collision avoidance.

Solution to Problem

A collision avoidance assistance device according to an aspect of the present invention is a collision avoidance assistance device configured to execute collision avoidance assistance for a vehicle with respect to an object around the vehicle. The collision avoidance assistance device includes: an object detection unit configured to detect the object; a planned execution timing determination unit configured to determine a planned execution timing at which the collision avoidance assistance is planned to be executed, based on the result of detection by the object detection unit; a motion characteristics value acquisition unit configured to acquire a motion characteristics value obtainable from at least a jerk of the vehicle in a comparison target time span which is a predetermined time span later than a detection timing at which the object detection unit detects the object and prior to the planned execution timing; and a collision avoidance assistance determination unit configured to determine whether or not to execute the collision avoidance assistance at the timing prior to the planned execution timing based on the result of comparison between the motion characteristics value acquired by the motion characteristics value acquisition unit and a reference motion characteristics value in the comparison target time span obtainable from a history of the past motion characteristics values.

In the collision avoidance assistance device in an aspect of the present invention, the collision avoidance assistance determination unit determines whether or not to execute the collision avoidance assistance at the timing prior to the planned execution timing based on the result of comparison between the motion characteristics value obtained from at least the jerk of the vehicle and the reference motion characteristics value obtained from the history of the past motion characteristics values in the comparison target time span prior to the planned execution timing at which the collision avoidance assistance is planned to be executed. Here, the jerk of the vehicle is a parameter from which the change of the amount of motion of the vehicle caused by an OFF operation of the accelerator pedal by the driver, an ON operation of the brake pedal by the driver or the like is easily extracted, and it can be presumably recognized that the reference motion characteristics value is a value expressing the characteristics of usual driving by the driver. Therefore, it is possible to determine whether or not to execute the collision avoidance assistance at the timing prior to the planned execution timing based on whether or not the current driving characteristics of the driver are different from the usual driving characteristics of the driver. In this way, it is possible to perform the collision avoidance assistance at the earlier execution timing while suppressing the generation of the unnecessary collision avoidance assistance compared to a case of not being based on the result of comparison between the motion characteristics value and the reference motion characteristics value.

As an embodiment, the motion characteristics value acquisition unit may acquire a motion characteristics value obtainable from the jerk of the vehicle and the acceleration of the vehicle in the comparison target time span. In this way, it is possible to perform the comparison of the motion characteristics value and the reference motion characteristics value using not only the jerk of the vehicle but also considering the acceleration of the vehicle. Here, the acceleration of the vehicle is a parameter from which the change of the amount of motion of the vehicle caused by the operation of decreasing a variable speed such as the engine brake operation by the driver or the change of the amount of motion of the vehicle after an operation of the accelerator pedal or after an operation of the brake pedal can easily be extracted. Therefore, by performing the determination of collision avoidance assistance using both the jerk of the vehicle and the acceleration of the vehicle, it is possible to perform the collision avoidance assistance at the earlier execution timing while further suppressing the generation of the unnecessary collision avoidance assistance.

As an embodiment, the motion characteristics value acquisition unit may acquire a ratio of the jerk of the vehicle and the acceleration of the vehicle in the comparison target time span as the motion characteristics value. It is possible to actualize the change of the motion characteristics of the vehicle that represents the characteristics of the driving operation performed by the driver by using the ratio of the jerk of the vehicle and the acceleration of the vehicle. In this way, it is possible to perform the collision avoidance assistance at the earlier execution timing while further suppressing the generation of the unnecessary collision avoidance assistance.

As an embodiment, in a case where a deviation degree between the motion characteristics value and the reference motion characteristics value is equal to or larger than a threshold value, the collision avoidance assistance determination unit may determine to execute the collision avoidance assistance at the timing prior to the planned execution timing. In this way, it is accurately determined whether or not the current driving operation state represented by the motion characteristics value is different from the usual driving operation state represented by the motion characteristics value. Therefore, it is possible to perform the collision avoidance assistance at the earlier execution timing while further suppressing the generation of the unnecessary collision avoidance assistance.

As an embodiment, the collision avoidance assistance device may further include an encounter-state determination unit that determines an encounter-state between the vehicle and the object. The encounter-state determination unit may determine whether the encounter-state of the object with respect to the vehicle is a crossing state or a translational state based on a first proximity degree which is obtained by dividing a relative distance between the vehicle and the object in the traveling direction by a relative speed between the vehicle and the object and a second proximity degree which is obtained by dividing the relative distance between the vehicle and the object in the direction intersecting the traveling direction of the vehicle by a relative speed between the vehicle and the object. The collision avoidance assistance determination unit may determine whether or not to execute the collision avoidance assistance at the timing prior to the planned execution timing based on the result of comparison between the motion characteristics value and the reference motion characteristics value for each encounter-state in the comparison target time span obtainable from the history of the past motion characteristics values in the encounter-state. It is considered that the temporal change of the motion characteristics value in a case where the encounter-state determined by the encounter-state determination unit is the translational state is different from that in a case where the encounter-state is the crossing state. Therefore, as the target of comparison with the motion characteristics value, by using the motion characteristics value for each encounter-state in the same encounter-state as the motion characteristics value, it is possible to improve the accuracy of the determination of whether or not to execute the collision avoidance assistance at the timing prior to the planned execution timing.

As an embodiment, in a case where the encounter-state is the crossing state, the collision avoidance assistance determination unit may use the crossing state reference motion characteristics value as the reference motion characteristics value for each encounter-state, which is obtainable from the history of the past motion characteristics values when the encounter-state determination unit determines that the encounter-state is the crossing state in the comparison target time span. It is considered that temporal changes in the motion characteristics value in a case where the encounter-state determined by the encounter-state determination unit is the crossing state are greater than those in a case where the encounter-state is the translational state. Therefore, in a case where the encounter-state is the crossing state, by using the crossing state reference motion characteristics value as the motion characteristics value for each encounter-state, it is possible to improve the accuracy of the determination of whether or not to execute the collision avoidance assistance at a timing prior to the planned execution timing.

A collision avoidance assistance method according to another aspect of the present invention is a collision avoidance assistance method for executing collision avoidance assistance for a vehicle with respect to an object around the vehicle. The collision avoidance assistance method includes: an object detection step of detecting the object; a planned execution timing determination step of determining a planned execution timing at which the collision avoidance assistance is planned to be executed, based on the result of detection in the object detection step; a motion characteristics value acquisition step of acquiring a motion characteristics value obtainable from a jerk of the vehicle in a comparison target time span which is a predetermined time span later than a detection timing at which the object is detected in the object detection step and prior to the planned execution timing determined in the planned execution timing determination step; and a collision avoidance assistance determination step of determining whether or not to execute the collision avoidance assistance at the timing prior to the planned execution timing based on the result of comparison between the motion characteristics value acquired in the motion characteristics value acquisition step and a reference motion characteristics value in the comparison target time span obtainable from a history of the motion characteristics values.

In the collision avoidance assistance method according to another aspect of the present invention, it is determined whether or not to execute the collision avoidance assistance at the timing prior to the planned execution timing based on the result of comparison between the motion characteristics value obtained from the jerk of the vehicle and the reference motion characteristics value obtained from the history of the past motion characteristics values in the comparison target time span prior to the planned execution timing at which the collision avoidance assistance is planned to be executed. Here, the jerk of the vehicle is a parameter from which the change of the amount of motion of the vehicle caused by an OFF operation of the accelerator pedal by the driver, an ON operation of the brake pedal by the driver or the like is easily extracted, and it can be presumably recognized that the reference motion characteristics value is a value expressing the characteristics of usual driving by the driver. Therefore, in a case where the current driving characteristics of the driver are different from the usual driving characteristics of the driver, it is possible to determine whether or not to execute the collision avoidance assistance at the timing prior to the planned execution timing. In this way, it is possible to perform the collision avoidance assistance at the earlier execution timing while suppressing the generation of the unnecessary collision avoidance assistance compared to a case of not being based on the result of comparison between the motion characteristics value and the reference motion characteristics value.

Advantageous Effects of Invention

According to the aspects of the present invention, it is possible to provide a collision avoidance assistance device and a collision avoidance assistance method that can perform the collision avoidance assistance in an earlier execution timing while suppressing the generation of an unnecessary collision avoidance assistance.

BRIEF DESCRIPTION OF DRAWINGS

FIGS. 4(a) and 4(b) are diagrams illustrating a calculation method of a first proximity degree A1, a second proximity degree A2, and an arrival time.

DESCRIPTION OF EMBODIMENTS

Figure 1:
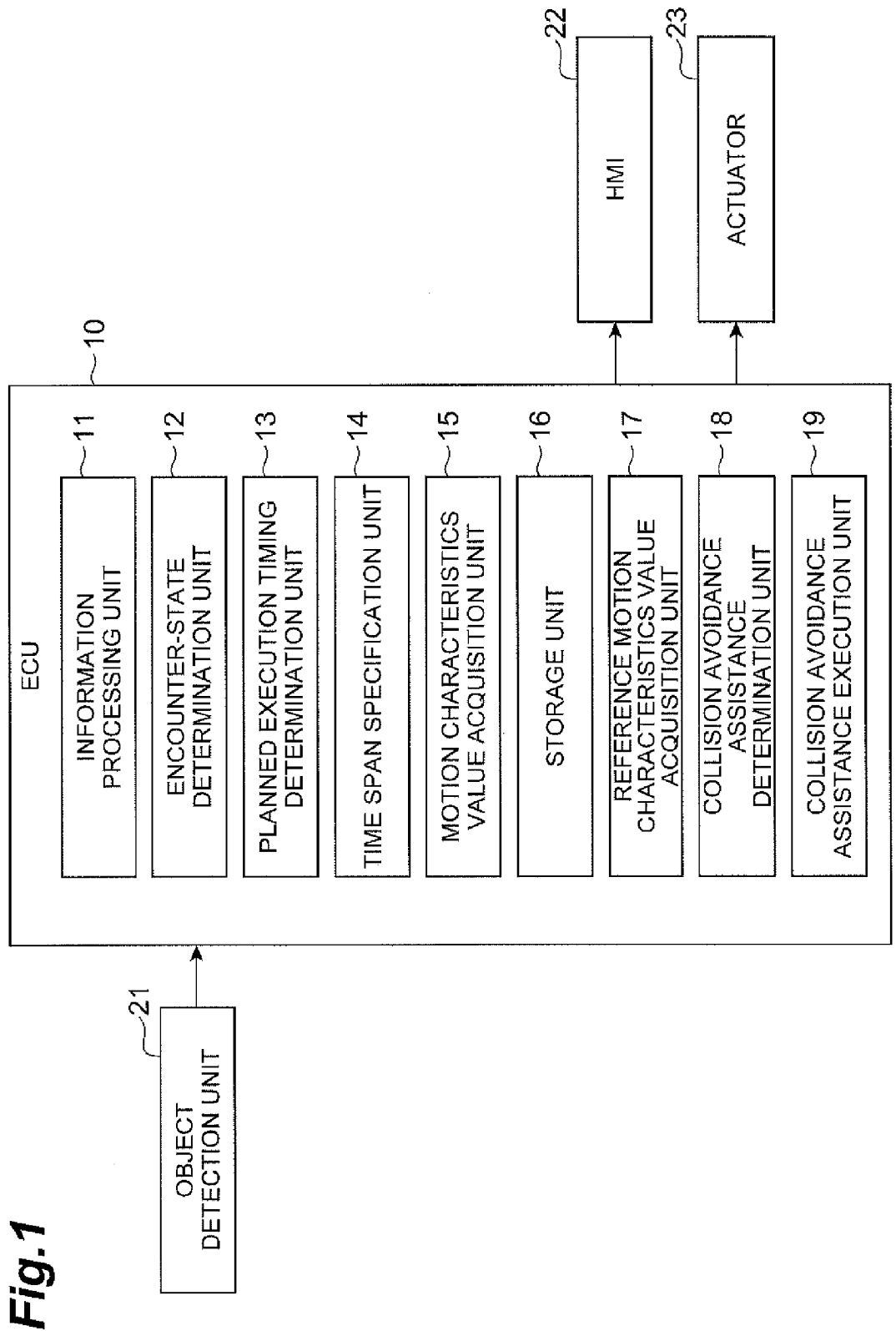
FIG. 1 is a block diagram illustrating a collision avoidance assistance device in an embodiment.

Hereinafter, a collision avoidance assistance device and a collision avoidance assistance method in an embodiment will be described in detail with reference to the drawings. The embodiment described below is an example to describe the present invention and the present invention is not limited to the descriptions below. In addition, the drawings are examples for describing the embodiment, and the embodiment is not limited to the drawings. The present invention can be implemented by appropriately modifying the embodiment within the scope of the invention. Dimensions and rates in the drawings are not limited to those illustrated in the drawings. In the description, the same reference signs are given to the same elements and the descriptions thereof will not be repeated.

The collision avoidance assistance device and the method are a device and a method that perform collision avoidance assistance for avoiding a collision between a vehicle and an object. A collision avoidance assistance device and the method for avoiding a collision of a vehicle and an object, a collision avoidance assistance device or a method for stabilizing a behavior of the vehicle, a collision avoidance assistance device or a method that improves the visibility of a driver by displaying an image in which surroundings of the vehicle are captured, a collision avoidance assistance device or a method that performs a collision prediction, and a collision avoidance assistance device or a method that causes the driver or the surroundings of the vehicle to pay attention by a notification or a warning can be exemplified as the collision avoidance assistance device and the method.

The object here is, for example, is a movable object that is possible collide with the vehicle such as a pedestrian, a bicycle, and a car. The collision avoidance includes at least one of, for example, collision avoidance by a braking intervention, collision avoidance by a steering intervention, and a warning to the driver. The braking intervention includes at least one of a braking by an automatic brake, a braking force support, and an action for urging the driver to perform the braking operation by a physical stimulation such as irradiation light, a voice, and a vibration. In addition, the steering intervention includes at least one of a turning by an automatic steering, a steering support, and an action for urging the driver to perform the steering operation by a physical stimulation such as irradiation of light, a voice, and a vibration. The warning includes at least one of the actions for urging the driver to perform the driving and check the surroundings by a physical stimulation such as irradiation of light, a voice, and a vibration. The collision avoidance, braking intervention, the steering intervention, and the warning may be known technologies other than those described above.

First, the collision avoidance assistance device and the collision avoidance assistance method in the embodiment will be described with reference to FIG. 1 to FIG. 11. FIG. 1 is block diagram illustrating the collision avoidance assistance device in the embodiment.

As illustrated in FIG. 1, a collision avoidance assistance device 1 is a device that is mounted on the vehicle and executes assistance for avoiding a collision of a vehicle with an object around the vehicle. The collision avoidance assistance device 1 is mainly configured with an electronic control unit (ECU) 10 that mainly performs collision avoidance assistance processing. An object detection unit 21, a human machine interface (HMI) 22, and an actuator 23 are connected to the ECU 10.

The object detection unit 21 is configured from sensors, a GPS, a navigation system mounted on the vehicle, and detects an object to become an obstacle around the vehicle. An object in front of the vehicle in the traveling direction can be detected by the object detection unit 21. In addition, the object detection unit 21 may acquire various information items necessary for the collision avoidance assistance. Various information items are the information items that can be acquired by the object detection unit 21 when the object to be the obstacle around the vehicle is detected, and, for example, include information on the vehicle, information on the object around the vehicle, and information on the situation around the vehicle when the vehicle encounters the object. As the sensors, a radar sensor, an image sensor, a vehicle speed sensor, a steering angle sensor, an accelerator sensor, or a brake sensor are used.

Here, the information on the vehicle includes motion information of the vehicle, position information of the vehicle, and operation information of the driver. A speed of the vehicle, an acceleration of the vehicle, a jerk of the vehicle (a differential value of the acceleration), and the like can be exemplified as the motion information of the vehicle. An operation of the accelerator (ON and OFF operation timing and operation amount), an operation of the brake (ON and OFF operation timing and operation amount), the steering operation, and the like can be exemplified as the operation information of the driver.

For example, the position information of the object around the vehicle and the motion information of the object can be exemplified as the information on the object around the vehicle. A speed and an acceleration of the object, a jerk, and the like can be exemplified as the motion information of the object around the vehicle. Travelling environment information around the vehicle can be exemplified as the information on the situation around the vehicle. As a specific example of the travelling environment information, for example, a surrounding environment (the weather, a time span, a temperature, a room temperature, and the like), a speed limit on a travelling road, a road alignment, structures on the road and the like can be exemplified.

The HMI 22 is used for executing a notification assistance that notifies the driver of the travelling state of the vehicle using visual information, auditory information, and tactile information. As a specific example of the HMI 22, for example, a monitor, a speaker, a vibrator, or a buzzer can be exemplified.

The actuator 23 is used for the execution of the collision avoidance assistance by the collision avoidance assistance device 1. As the actuator 23, for example, a brake actuator, a steering actuator, or a seat belt actuator can be exemplified.

The ECU 10 includes, for example, an information processing unit 11, an encounter-state determination unit 12, a planned execution timing determination unit 13, a time span specification unit 14, a motion characteristics value acquisition unit 15, a storage unit 16, a reference motion characteristics value acquisition unit 17, a collision avoidance assistance determination unit 18, and a collision avoidance assistance execution unit 19. The ECU 10 is mainly configured with a CPU, a ROM, and a RAM, and realizes the functions of the information processing unit 11, the encounter-state determination unit 12, the planned execution timing determination unit 13, the time span specification unit 14, the motion characteristics value acquisition unit 15, the storage unit 16, the reference motion characteristics value acquisition unit 17, the collision avoidance assistance determination unit 18, and the collision avoidance assistance execution unit 19 by executing a program using the CPU. The information processing unit 11, the encounter-state determination unit 12, the planned execution timing determination unit 13, the time span specification unit 14, the motion characteristics value acquisition unit 15, the storage unit 16, the reference motion characteristics value acquisition unit 17, the collision avoidance assistance determination unit 18, and the collision avoidance assistance execution unit 19 may be realized by equal to or more than two ECUs.

The information processing unit 11 calculates relative motion information that indicates a relative state of the moving between the vehicle and the object and information relating to the position relationship between the vehicle and the object from the various information items acquired by the object detection unit 21.

As the relative motion information, a relative distance, a relative speed, a relative acceleration, and a relative jerk (a time differential value of the relative acceleration) between the vehicle and the object in the vehicle traveling direction, and the relative distance, the relative speed, the relative acceleration, and the relative jerk between the vehicle and the object in the direction intersecting the vehicle traveling direction are calculated. As the information relating to the position relationship between the vehicle and the object, information on the position relationship between the vehicle and the object in the vehicle traveling direction and information relating to the position relationship between the vehicle and the object at the time of encountering in the direction intersecting the vehicle traveling direction, are calculated. The direction intersecting the vehicle traveling direction may be any one of a vehicle width direction, a direction orthogonally intersecting the vehicle traveling direction, and a direction obliquely intersecting the vehicle traveling direction.

The information processing unit 11 calculates a driving index at the time when the vehicle encounters the object using the various acquired information items and the calculated relative motion information. For example, the first proximity degree A1 and the second proximity degree A2 that indicate the proximity degree of the vehicle to the object and the arrival time TTC can be exemplified as the driving index.

The first proximity degree A1 is an index value indicating the proximity degree of the vehicle and the object in the vehicle traveling direction. The second proximity degree A2 is an index value indicating the proximity degree of the vehicle and the object in the direction intersecting the vehicle traveling direction. The arrival time TTC is a time indicating the proximity degree of the vehicle and the object, and may be a time predicted for the vehicle to collide with the encountered object. Methods for calculating the first proximity degree A1, second proximity degree A2, and the arrival time TTC will be described below.

The encounter-state determination unit 12 determines an encounter-state between the vehicle and the object based on at least one of the acquired various information items and the calculated driving index. As the result of the determination of the encounter-state between the vehicle and the object (encounter-state determination result), a state in which an object is crossing in front of the vehicle (crossing state), a state in which an object is in translation with the vehicle (translational state), or a state in which an object is stopped (stopped state) can be exemplified. For example, in a case where the ratio of the first proximity degree A1 and the second proximity degree A2 described above is equal to or smaller than a threshold value, the encounter-state determination unit 12 determines that the encounter-state between the vehicle and the object is the translational state.

The planned execution timing determination unit 13 determines a planned execution timing at which the collision avoidance assistance for the vehicle is planned to be executed based on the result of detection by the object detection unit 21. The planned execution timing determination unit 13 may determine the planned execution timing based on the detection of the object by the object detection unit 21. In addition, the planned execution timing determination unit 13 may determine the planned execution timing based on the encounter-state determination result by the encounter-state determination unit 12. For example, the planned execution timing determination unit 13 determines the planned execution timing if the encounter-state determination result is the crossing state, and does not determine the planned execution timing if the encounter-state determination result is the translational state. The planned execution timing is a timing at which the collision avoidance assistance device 1 plans to execute the collision avoidance assistance, and for example, is a timing at which, if the collision avoidance operation is not executed, the possibility that the vehicle collides with the object becomes equal to or higher than a certain value. The planned execution timing may be expressed as the arrival time TTC. In this case, the planned execution timing can be set as the arrival time TTC set in advance.

The time span specification unit 14 specifies a comparison target time span that is a predetermined time span after a detection timing at which the object is detected by the object detection unit 21 and before the planned execution timing. The start point of the comparison target time span may be set as a second timing and the end point of the comparison target time span may be set as a third timing. The second timing is a timing at which a collision prediction risk with the object is equal to or greater than a certain amount and the third timing is a timing between the planned execution timing and the second timing. The second timing may be expressed, for example, as the arrival time TTC as a timing arbitrarily specified when the planned execution timing is specified. In this case, the second timing can be set as the arrival time TTC set in advance. In addition, the second timing can be set as the timing at which the encounter-state is finished after recognizing that the vehicle encounters the object. The third timing is a timing arbitrarily specified when the planned execution timing is determined, and may be expressed as the arrival time TTC. In this case, the third timing can be set as the arrival time TTC set in advance. In addition, the third timing can be set as the timing before the first timing by ΔTb, for example. ΔTb indicates a time interval from an end timing of the comparison target time span to the planned execution timing. ΔTb is a value set in advance. In addition, the third timing may set as a timing at which the driving operation state determination described below is finished.

The motion characteristics value acquisition unit 15 acquires a motion characteristics value in the comparison target time span. The motion characteristics value is a value obtainable from the jerk of the vehicle in the comparison target time span. In the present embodiment, the jerk of the vehicle is a relative jerk between the vehicle and the object, and may be a jerk of the vehicle itself. The jerk of the vehicle is a parameter from which a change of an amount of motion of the vehicle caused by, for example, an OFF operation of the accelerator pedal by the driver, an ON operation of the brake pedal by the driver or the like can easily be extracted.

The motion characteristics value may be obtained from the jerk of the vehicle and the acceleration of the vehicle in the comparison target time span. In the present embodiment, the acceleration of the vehicle is a relative acceleration between the vehicle and the object, and may be the vehicle acceleration. The acceleration of the vehicle is a parameter from which a change of an amount of motion of the vehicle caused by the operation of decreasing a variable speed such as an engine brake operation by the driver, a change of an amount of motion of the vehicle after the operation of the accelerator pedal or after the operation of the brake pedal and the like can easily be extracted.

It is preferable that the motion characteristics value is a ratio of the jerk of the vehicle and the acceleration of the vehicle (the motion characteristics of the vehicle), and it is further preferable that the motion characteristics value is a value obtained by dividing the jerk of the vehicle by the acceleration of the vehicle. In a case where the motion characteristics value is the ratio of the jerk of the vehicle and the acceleration of the vehicle, particularly in a case where the motion characteristics value is a value obtained by dividing the jerk of the vehicle by the acceleration of the vehicle, it is possible to actualize the change of the characteristics of the driving operation performed by the driver. Specifically, it is possible to check the change of the amount of motion of both the jerk of the vehicle and the acceleration of the vehicle by acquiring the motion characteristics value. In addition, the characteristics of each of the jerk of the vehicle and the acceleration of the vehicle can easily be emphasized. The motion characteristics of the vehicle is calculated, for example, as Equation below when the relative distance between the vehicle and the object is Dr at a time point t.

$$\dddot{D}_r(t) / \ddot{D}_r(t) = \Delta \cdot \frac{D_r(t+3\Delta) - 3D_r(t+2\Delta) + 3D_r(t+\Delta) - D_r(t)}{D_r(t+2\Delta) - 2D_r(t+\Delta) + D_r(t)} \quad \text{[Equation 1]}$$

The storage unit 16 stores the history of the past motion characteristics values. The history of the past motion characteristics values is a set of values in which the motion characteristics values are associated with each encounter-state determination results (crossing state, translational state), and the associated motion characteristics values are statistically processed. In the statistical processing, for example, a center value or a most frequent value is calculated from a plurality of past motion characteristics values, and the center value or the most frequent value can be the history of the past motion characteristics values. For example, the storage unit 16 calculates and stores the center value and the most frequent value of the motion characteristics value for each encounter-state determination result and does not store an abnormal value determined based on the center value and the most frequent value. In addition, in a case where the association of the encounter-state determination result with the associated motion characteristics values is inappropriate, the storage unit 16 may not store the motion characteristics value. In this way, the storage unit 16 can store the motion characteristics value with high accuracy for each encounter-state determination result. In a case where the planned execution timing is not determined in accordance with the encounter-state determination result, the history of the past motion characteristics values may not be stored in association with the encounter-state determination result.

In addition, the storage unit 16 stores and accumulates, for example, various information items acquired by the object detection unit 21, the driving index calculated by the information processing unit 11, the encounter-state determination result determined by the encounter-state determination unit 12, the planned execution timing determined by the planned execution timing determination unit 13, the comparison target time span specified by the time span specification unit 14, and the motion characteristics value acquired by the motion characteristics value acquisition unit 15 as the past data. The storage unit 16 may associate the past data with each encounter-state determination result. For example, the storage unit 16 stores various information items and the driving indices in association with each encounter-state determination result. In addition, the storage unit 16 may store the past data in association with the arrival time. The history of the past motion characteristics values may be included in the past data.

The reference motion characteristics value acquisition unit 17 acquires a reference motion characteristics value in the comparison target time span specified by the time span specification unit 14. The reference motion characteristics value is a parameter corresponding to the motion characteristics value, and is a parameter obtainable from the history of the past motion characteristics values. The reference motion characteristics value can be acquired from, for example, the history of the past motion characteristics values stored in the storage unit 16. In addition, the reference motion characteristics value acquisition unit 17 may calculate the reference motion characteristics value in the comparison target time span from the past data stored in the storage unit 16. The reference motion characteristics value acquisition unit 17 may acquire the reference motion characteristics value for each encounter-state in the comparison target time span, the reference motion characteristics value being obtainable from the history of the past motion characteristics values for each encounter-state determined by the encounter-state determination unit 12 as the reference motion characteristics value. The reference motion characteristics value for each encounter-state includes, for example, the crossing state reference motion characteristics value and the translational state reference motion characteristics value. The crossing state reference motion characteristics value is the reference motion characteristics values for each encounter-state in the comparison target time span, which is obtainable from the history of the past motion characteristics values when the encounter-state determination unit 12 determines that the encounter-state is the crossing state. The translational state reference motion characteristics value is the reference motion characteristics values for each encounter-state in the comparison target time span, which is obtainable from the history of the past motion characteristics values when the encounter-state determination unit 12 determines that the encounter-state is the translational state. Hereinafter, the description will be made with the reference motion characteristics value as the reference motion characteristics value for each encounter-state. However, the description may be made with the reference motion characteristics value, not the reference motion characteristics value for each encounter-state.

For example, in a case where the motion characteristics value is the ratio of the jerk of the vehicle and the acceleration of the vehicle (motion characteristics of the vehicle), the reference motion characteristics value is the ratio of the statistically processed jerk of the vehicle and the statistically processed acceleration of the vehicle (the usual motion characteristics of the vehicle). In this case, the reference motion characteristics value indicates the characteristics of the usual driving of the driver corresponding to the encounter-state determination result. Therefore, it is possible to actualize the change characteristics of the usual driving of the driver using the reference motion characteristics value corresponding to the encounter-state determination result.

The collision avoidance assistance determination unit 18 determines whether or not to execute the collision avoidance assistance for the vehicle at the planned execution timing determined by the planned execution timing determination unit 13 based on the encounter-state determination result determined by the encounter-state determination unit 12. For example, the collision avoidance assistance determination unit 18 determines whether or not to execute the collision avoidance assistance for the vehicle at the planned execution timing based on the encounter-state determination result described above and the arrival time TTC calculated by the information processing unit 11. The determination whether or not to execute the collision avoidance assistance for the vehicle at the planned execution timing based on the encounter-state determined by the encounter-state determination unit 12 may be performed only in a case where the encounter-state is determined to be the crossing state.

The collision avoidance assistance determination unit 18 determines whether or not to execute the collision avoidance assistance for the vehicle at the timing prior to the planned execution timing based on a result of comparison between the motion characteristics value acquired by the motion characteristics value acquisition unit 15 and the reference motion characteristics value (reference motion characteristics value for each encounter-state) in the comparison target time span obtained from the history of the past motion characteristics values in the encounter-state determined by the encounter-state determination unit 12. Specifically, in a case where the encounter-state determined by the encounter-state determination unit 12 is the crossing state, the collision avoidance assistance determination unit 18 determines whether or not to execute the collision avoidance assistance for the vehicle at the timing prior to the planned execution timing based on the result of comparison between the motion characteristics value acquired by the motion characteristics value acquisition unit 15 and the crossing state reference motion characteristics value in the comparison target time span obtained from the history of the past motion characteristics values when the encounter-state determination unit 12 determines that the encounter-state is the crossing state. In addition, in a case where the encounter-state determined by the encounter-state determination unit 12 is the translational state, the collision avoidance assistance determination unit 18 determines whether or not to execute the collision avoidance assistance for the vehicle at the timing prior to the planned execution timing based on the result of comparison between the motion characteristics value acquired by the motion characteristics value acquisition unit 15 and the translational state reference motion characteristics value in the comparison target time span obtained from the history of the past motion characteristics values when the encounter-state determination unit 12 determines that the encounter-state is the translational state. The collision avoidance assistance determination unit 18 determines whether or not to execute the collision avoidance assistance for the vehicle prior to the planned execution timing by comparing, for example, the temporal change (the current driving operation situation) of the motion characteristics value and the temporal change (the usual driving operation situation) of the reference motion characteristics value.

The timing prior to the planned execution timing is the timing later than the comparison target time span, and is set as an arbitrary timing in the time span prior to the planned execution timing. The time interval from the timing prior to the planned execution timing to the planned execution timing is longer than zero seconds and shorter than $\Delta Tb$. As long as satisfying the time interval and the timing described above, the timing prior to the planned execution timing can be set so as to be a timing prior to the planned execution timing by a predetermined length of time. In addition, as long as satisfying the time interval and the timing described above, the timing prior to the planned execution timing can also be set so as to be a timing later than the end timing of the comparison target time span by a predetermined length of time. By determining the execution of the collision avoidance assistance at the timing even a little prior to the planned execution timing, it is possible to reduce a possibility of the collision of the vehicle with the object. The determination whether or not to execute the collision avoidance assistance for the vehicle at the planned execution timing and at the timing prior to the planned execution timing based on the encounter-state determined by the encounter-state determination unit 12 may be performed only in a case where the encounter-state is determined to be the crossing state.

In a case where a deviation degree between, for example, the motion characteristics value and the reference motion characteristics value in the comparison target time span is large, the collision avoidance assistance determination unit 18 determines to execute the collision avoidance assistance at the timing prior to the planned execution timing. Whether or not the deviation degree is large can be determined based on, for example, whether or not the deviation degree is equal to or greater than a threshold value. In this case, in a case where the deviation degree is equal to or greater than the threshold value, the deviation degree can be determined to be large. In addition, by preparing a map in advance in which a relationship between the deviation degree and the time interval is set such that time interval from the planned execution timing to the earlier assistance timing becomes longer as the deviation degree becomes larger and by applying the deviation degree to the map, it is possible to determine whether or not the deviation degree is large. Whether or not the deviation degree is large may be determined based on references other the reference described above. Here, in a case where the motion characteristics value is the motion characteristics of the vehicle and the reference motion characteristics value is the usual motion characteristics of the vehicle, the temporal change of the current driving characteristics of the driver and the temporal change of the usual driving characteristics of the driver, which correspond to the encounter-state determination result, can be compared. In this way, it is possible to easily check whether or not the current driving operation state and the usual driving operation state, which correspond to the encounter-state determination result, are deviated. The deviation degree can be acquired by, for example, calculating the difference between the motion characteristics value at the arbitrary timing in the comparison target time span and the reference motion characteristics value.

The collision avoidance assistance execution unit 19 executes the starting of the collision avoidance assistance at the execution timing corresponding to the determination by the collision avoidance assistance determination unit 18. The execution of the collision avoidance assistance is not limited to a transition from the state in which the collision avoidance assistance is not executed to the state in which the collision avoidance assistance is executed. For example, a switching of the state from the state in which the collision avoidance assistance is executed to a state in which another collision avoidance assistance is executed and further executing another collision avoidance assistance in the state in which the collision avoidance assistance is executed are included in the execution of the collision avoidance assistance.

In a case where the collision avoidance assistance determination unit 18 determines to execute the collision avoidance assistance at the timing prior to the planned execution timing, the collision avoidance assistance execution unit 19 executes the collision avoidance assistance for the vehicle at the timing prior to the planned execution timing. As the collision avoidance assistance at the timing prior to the planned execution timing, for example, one or plurality of assistances among the braking intervention, steering intervention, and the warning to the driver can exemplified. In the present embodiment, the collision avoidance assistance execution unit 19 executes the collision avoidance assistance of performing the warning to the driver as the collision avoidance assistance at the timing prior to the planned execution timing. The collision avoidance assistance at the timing prior to the planned execution timing may include other collision avoidance assistances.

In a case where the collision avoidance assistance determination unit 18 determines to execute the collision avoidance assistance at the planned execution timing, the collision avoidance assistance execution unit 19 executes the collision avoidance assistance for the vehicle at the planned execution timing. The collision avoidance assistance for the vehicle at the planned execution timing may be the collision avoidance assistance same as the collision avoidance assistance for the vehicle at the timing prior to the planned execution timing or may be a different and new collision avoidance assistance. As the collision avoidance assistance at the planned execution timing, for example, one or a plurality of assistances among the braking intervention, steering intervention, and the warning to the driver can be exemplified. In the present embodiment, the collision avoidance assistance execution unit 19 executes the braking assistance which is one of the braking interventions as the collision avoidance assistance at the planned execution timing. The collision avoidance assistance at the planned execution timing may include other collision avoidance assistances.

Even when the collision avoidance assistance is not executed at the timing prior to the planned execution timing, the collision avoidance assistance execution unit 19 may execute the collision avoidance assistance at the planned execution timing. Even when the collision avoidance assistance is executed at the timing prior to the planned execution timing, the collision avoidance assistance execution unit 19 may not execute the collision avoidance assistance at the planned execution timing. Even when the collision avoidance assistance is executed at the timing prior to the planned execution timing, the collision avoidance assistance execution unit 19 may execute the new different collision avoidance assistance at the planned execution timing.

Figure 2:
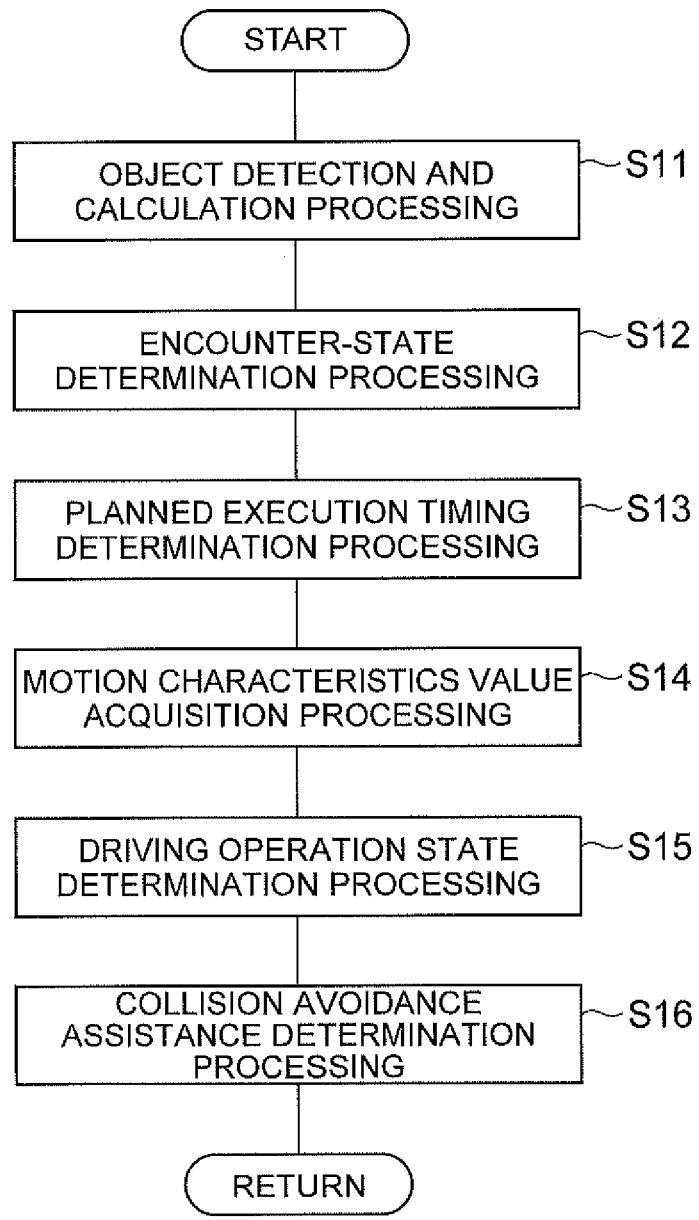
FIG. 2 is a flow chart describing a collision avoidance assistance method in the embodiment.

Next, an example of a collision avoidance assistance method in the present embodiment will be described. FIG. 2 is a flow chart describing a collision avoidance assistance method in the present embodiment. As illustrated in FIG. 2, the collision avoidance assistance method in the present embodiment is divided into object detection and calculation processing (S11), encounter-state determination processing (S12), planned execution timing determination processing (S13), motion characteristics value acquisition processing (S14), driving operation state determination processing (S15), and collision avoidance assistance determination processing (S16). In the description below, the object detection and calculation processing (S11), the encounter-state determination processing (S12), the planned execution timing determination processing (S13), the motion characteristics value acquisition processing (S14), the driving operation state determination processing (S15), and the collision avoidance assistance determination processing (S16) are separately described. However, the object detection and calculation processing (S11), the encounter-state determination processing (S12), the planned execution timing determination processing (S13), the motion characteristics value acquisition processing (S14), the driving operation state determination processing (S15), and the collision avoidance assistance determination processing (S16) may be processed in parallel respectively.

The object detection and calculation processing (S11) is an object detection step of detecting objects around the vehicle. In the object detection and calculation processing (S11), the object detection unit 21 detects an object which can be an obstacle around the vehicle. In addition, the object detection unit 21 acquires various information items necessary for the collision avoidance assistance. In addition, the information processing unit 11 calculates, for example, the relative speed, the relative acceleration, the relative jerk between the vehicle and the object and the driving indices by calculating the acquired various information items. The driving indices are, for example, the first proximity degree A1, the second proximity degree A2, and the arrival time TTC.

In the encounter-state determination processing (S12), the encounter-state determination unit 12 determines the encounter-state of the vehicle and the object. The encounter-state of the vehicle and the object is determined using at least one of the acquired various information items and the calculated driving indices. In this way, encounter-state determination result is generated. The collision avoidance assistance determination unit 18 determines whether or not to execute the collision avoidance assistance for the vehicle based on the encounter-state determination result. For example, in a case where the encounter-state determination unit 12 determines that the encounter-state is the crossing state, the collision avoidance assistance determination unit 18 determines to execute the collision avoidance assistance.

The planned execution timing determination processing (S13) is a planned execution timing determination step of determining the planned execution timing at which the collision avoidance assistance is planned to be executed based on the detection result by the object detection unit 21. In the planned execution timing determination processing (S13), the planned execution timing determination unit 13 determines the planned execution timing at which the collision avoidance assistance for the vehicle is planned to be executed. Then, the storage unit 16 stores the determined planned execution timing. The storage of the planned execution timing may be processed at any time after S13.

The motion characteristics value acquisition processing (S14) is a motion characteristics value acquisition step of acquiring the motion characteristics value obtainable from the jerk of the vehicle in the comparison target time span that is a predetermined time span later than the detection timing at which the object is detected in the object detection and calculation processing (S11) and the prior to the planned execution timing determined in the planned execution timing determination processing (S13). In the motion characteristics value acquisition processing (S14), the motion characteristics value acquisition unit 15 acquires the motion characteristics value in the comparison target time span.

The driving operation state determination processing (S15) is a driving operation state determination processing step of determining the driving operation state based on the comparison between the motion characteristics value acquired in the motion characteristics value acquisition processing (S14) and the reference motion characteristics value obtained from the history of the past motion characteristics values. In the driving operation state determination processing (S15), the collision avoidance assistance determination unit 18 determines whether or not the current driving operation state of the driver is the usual driving operation state of the driver. For example, in a case where the encounter-state of the vehicle and the object is the crossing state, it is determined whether or not the deceleration operation is performed at the timing when the driver usually performs deceleration operation, and whether or not the operation of releasing the accelerator pedal is performed at the timing when the driver usually performs the operation of releasing the accelerator pedal. The driving operation state determination is performed after the motion characteristics value in the motion characteristics value acquisition processing (S14) by comparing the motion characteristics value and the reference motion characteristics value acquired by the reference motion characteristics value acquisition unit 17.

The collision avoidance assistance determination processing (S16) is a collision avoidance assistance determination step of determining whether or not to execute the collision avoidance assistance at the timing prior to the planned execution timing determined in the planned execution timing determination processing (S13) based on the result of comparison between the motion characteristics value acquired in the motion characteristics value acquisition processing (S14) and the reference motion characteristics value in the comparison target time span obtained from the history of the past motion characteristics values. In the collision avoidance assistance determination processing (S16), the collision avoidance assistance determination unit 18 determines whether or not to execute the collision avoidance assistance for the vehicle based on the determination result of the driving operation state determined in the driving operation state determination processing (S15). The above-described determination by the collision avoidance assistance determination unit 18 is performed at the timing prior to the planned execution timing.

Figure 3:
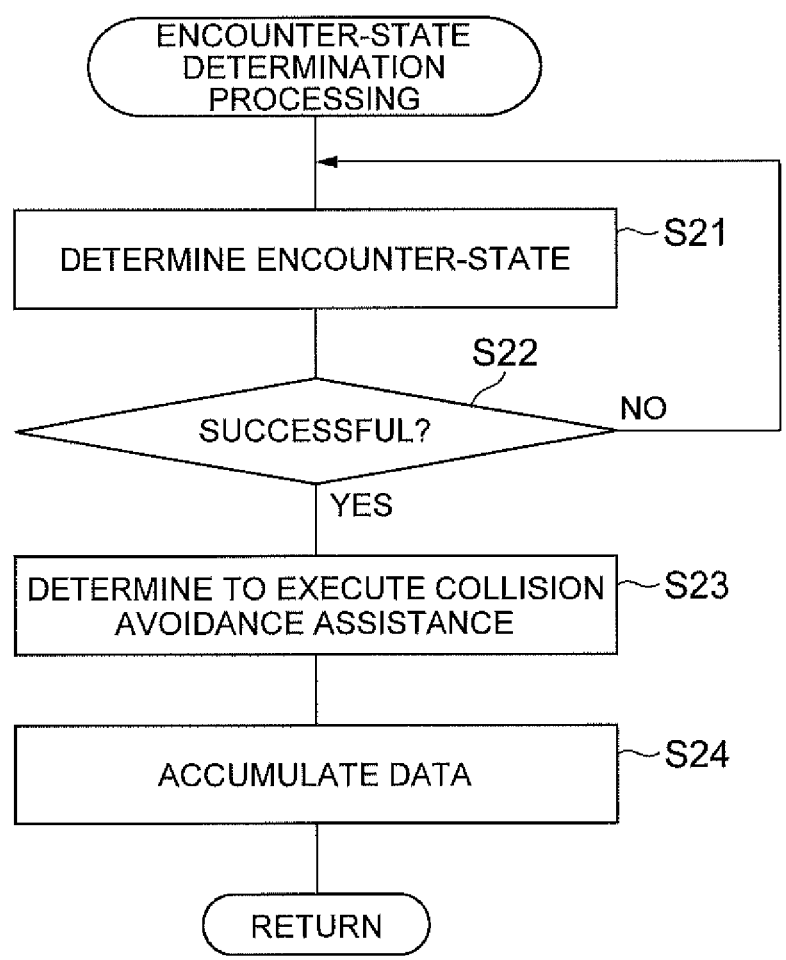
FIG. 3 is a flow chart describing an encounter-state determination processing.
Figure 5:
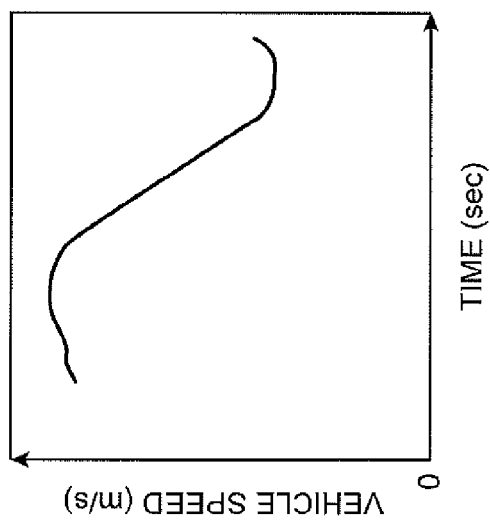
FIGS. 5(a), 5(b), and 5(c) are graphs illustrating a change in distance between a vehicle and an object or change in speed according to a time change.
Figure 5:
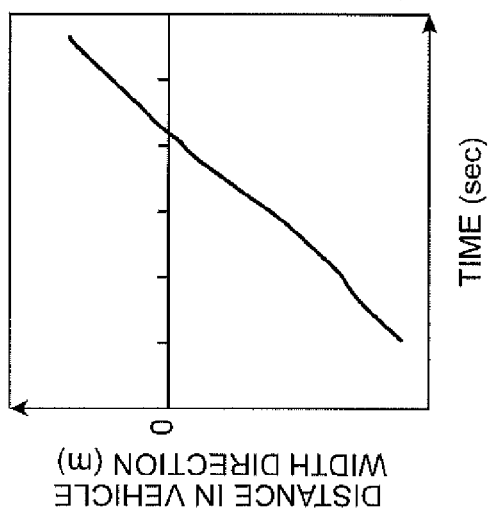
Figure 5:
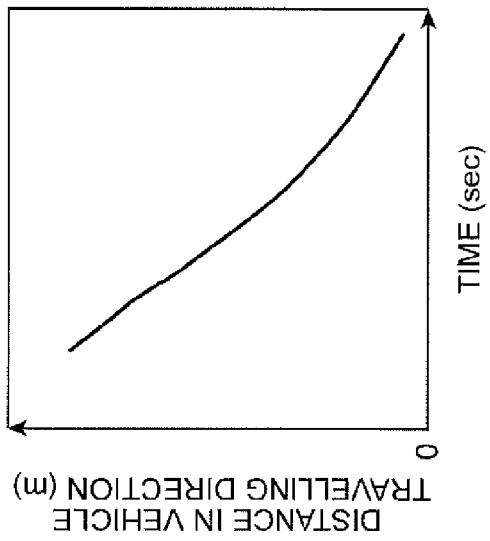

Next, an example of the determination processing that determines the encounter-state of the vehicle and the object will be described with reference to FIG. 3. FIG. 3 is a flow chart illustrating details of the encounter-state determination processing (S12).

As illustrated in FIG. 3, when the encounter-state determination processing starts, the encounter-state of the vehicle and the object is determined using at least one of the various information items acquired in the object detection and calculation processing (S11) and the calculated driving indices (S21). The encounter-state determination unit 12 determines the encounter-state of the vehicle and the object. By the determination, it is determined whether the encounter-state of the vehicle and the object is the crossing state, the translational state, or unclear. In a case where the encounter-state of the vehicle and the object is determined to be unclear (No in S22), the determination of the encounter-state of the vehicle and the object is performed again.

In a case where the determination of the encounter-state of the vehicle and the object is successful (Yes in S22), the collision avoidance assistance determination unit 18 determines to execute the collision avoidance assistance for the vehicle (S23). Then, the storage unit 16 stores the encounter-state determination result (S24). S24 may be performed at any time after S22. In addition, the collision avoidance assistance determination unit 18 may determine to execute the collision avoidance assistance for the vehicle without performing the determination of the encounter-state.

Here, an example of method of calculating the first proximity degree A1, the second proximity degree A2, and the arrival time TTC which are the driving indices will be described. FIGS. 4(*a*) and 4(*b*) are diagrams illustrating the method of calculating the first proximity degree A1, the second proximity degree A2, and the arrival time TTC. In FIG. 4(*a*), an example of a moving state of a vehicle C and an object O is illustrated. In FIG. 4(*b*), a calculation result of the first proximity degree A1, the second proximity degree A2, and the arrival time TTC is illustrated.

In the example illustrated in FIG. 4(*a*), the moving state of the vehicle C and the object O is represented on a coordinates plane in which the vehicle traveling direction is indicated on an x axis and the vehicle width direction is indicated on an y axis. The vehicle C positions at the origin (0, 0), the object O positions at (X, Y). Therefore, a relative distance in the vehicle traveling direction is expressed as Xr=X, and a relative distance in the vehicle width direction Yr=Y, and a relative distance Dr between the vehicle C and the object O is expressed as $Dr=(Xr^2+Y^2)^{1/2}$. In addition, the vehicle C travels at a speed vc and the object O moves at a speed vo. Therefore, a relative speed between the vehicle C and the object O is expressed as $Vr=(vc^2+vo^2)^{1/2}$. The y axis is not limited to the vehicle width direction, but may be a direction intersecting the vehicle traveling direction. In addition, the speed vc of the vehicle C is indicated with the traveling direction as positive and the speed vo of the object O is indicated with the direction approaching the vehicle C as positive. In a case where the speed vc and speed vo has negative values, the speeds are regarded as zero.

As illustrated in FIG. 4(b), a relative proximity degree A between the vehicle C and the object O has a value Dr/Vr which is obtained by dividing the relative distance Dr between the vehicle C and the object O by the relative speed Vr. In the present embodiment, the first proximity degree A1 has a value Xr/Vr obtained by dividing the relative distance Xr in the vehicle traveling direction by the relative speed Vr. The second proximity degree A2 has a value Yr/Vr obtained by dividing the relative distance Yr in the vehicle width direction by the relative speed Vr. The first proximity degree A1 is also an index value indicating a proximity degree between the vehicle C and an object O in the vehicle traveling direction, and the second proximity degree A2 is also an index value indicating a proximity degree between the vehicle C and an object O in the vehicle width direction. The first proximity degree A1 and the second proximity degree A2 may be obtained by decomposing the relative proximity degree A between the vehicle C and the object O into a vehicle traveling direction component and a vehicle width direction component.

In addition, in the example illustrated in FIG. 4(a), a path of the vehicle C and a path of the object O intersect at a point P. A distance from the vehicle C to the point P is D. Therefore, as illustrated in FIG. 4(b), the arrival time TTC is expressed as TTC=D/vc which is a value obtained by dividing the distance D from the vehicle C to the intersection point P by the speed vc of the vehicle C.

The first proximity degree A1 and the second proximity degree A2 can be obtained based on the relative distance Dr between the vehicle and the object and the relative speed Vr between the vehicle and the object. Therefore, the first proximity degree A1 and the second proximity degree A2 can be obtained even in a state in which the point P where the path of the vehicle and the path of the object are intersected is not present, and in addition, the second proximity degree A2 can be obtained even in a state in which the speed of the object is almost zero.

Next, an example of a method of determining the encounter-state of the vehicle and the object using the first proximity degree A1 and the second proximity degree A2 which are the driving indices will be described.

A change in driving index when the encounter-state of the vehicle and the object is the crossing state will be described using FIGS. 5(a), 5(b), 5(c) and FIG. 6. FIG. 5(a) illustrates the changes in distance between the vehicle and the object in the vehicle traveling direction according to the time change when the encounter-state is the crossing state. The vertical axis in FIG. 5(a) indicates the distance between the vehicle and the object in the vehicle traveling direction, and the horizontal axis indicates the time. FIG. 5(b) illustrates the change in distance between the vehicle and the object in the vehicle width direction according to the time change when the encounter-state of the vehicle is in the crossing state. The vertical axis in FIG. 5(b) indicates the distance between the vehicle and the object in the vehicle width direction, and the horizontal axis indicates the time. FIG. 5(c) illustrates a change in speed of the vehicle according the time change when the encounter-state is the crossing state. The vertical axis in FIG. 5(c) indicates the vehicle speed and the horizontal axis indicates the time.

Figure 6:
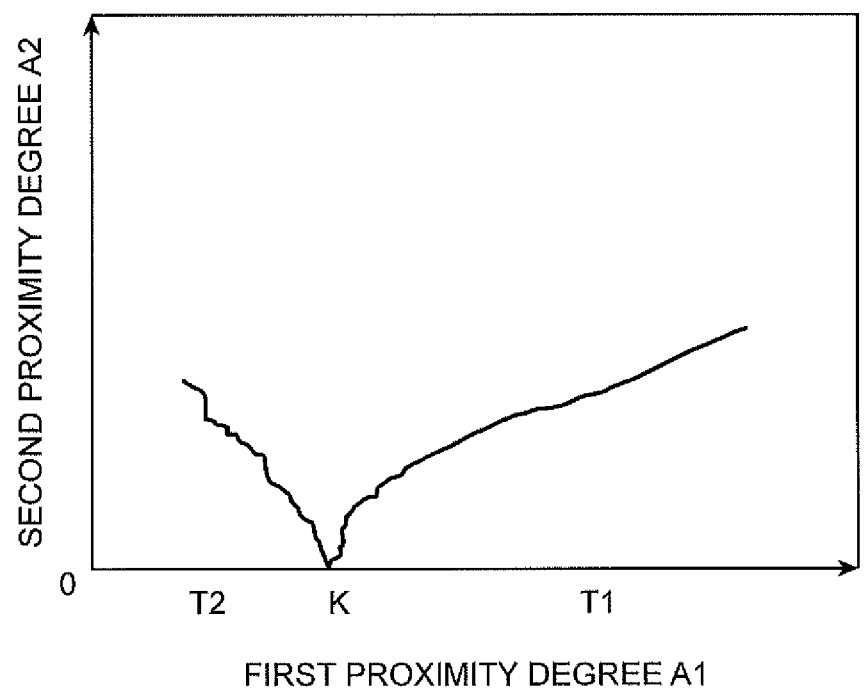
FIG. 6 is a graph illustrating changes of the first proximity degree A1 and the second proximity degree A2 in a crossing state.

FIG. 6 is a graph illustrating a change of the first proximity degree A1 and the second proximity degree A2 which are the driving indices calculated from the data illustrated in FIG. 5(a) to FIG. 5(c). The horizontal axis indicates the first proximity degree A1 and the vertical axis indicates the second proximity degree A2. In a case where the first proximity degree A1 is zero, it indicates that the arrival time to and from the vehicle and the object in the vehicle traveling direction is zero, and the distance between the vehicle and the object in the vehicle traveling direction is zero. Similarly, in a case where the second proximity degree A2 is zero, it indicates that the arrival time to and from the vehicle and the object in the vehicle width direction is zero, and the distance between the vehicle and the object in the vehicle width direction is zero. Therefore, in FIG. 6, as the values of the first proximity degree A1 and the second proximity degree A2 become smaller, it indicates that the distance between the vehicle and the object becomes closer. When both the values of the first proximity degree A1 and the second proximity degree A2 are zero, it indicates that the vehicle and the object are in contact with each other.

As illustrated in FIG. 6, when the first proximity degree A1 decreases from T1 to K, the second proximity degree A2 decreases. Then, at the time point when the first proximity degree A1 is K, the second proximity degree A2 becomes zero. Therefore, when the first proximity degree A1 decreases from T1 to K, the vehicle and the object approach each other in the vehicle traveling direction and the vehicle width direction. When the first proximity degree A1 is K, the vehicle and the object are located on the position in the vehicle traveling direction.

When the first proximity degree A1 decreases from K to T2, the second proximity degree A2 increases. Therefore, when the first proximity degree A1 decreases from K to T2, the vehicle and the object approach each other in the vehicle traveling direction and the vehicle and the object are separated from each other in the vehicle width direction. Accordingly, it can be understood that the data in FIG. 6 illustrates the fact that the object approaches the vehicle in the vehicle width direction, and then, is separated from the vehicle as the vehicle approach the object in the vehicle traveling direction. That is, in FIG. 6, the characteristics indicating the crossing state is appeared.

Figure 7:
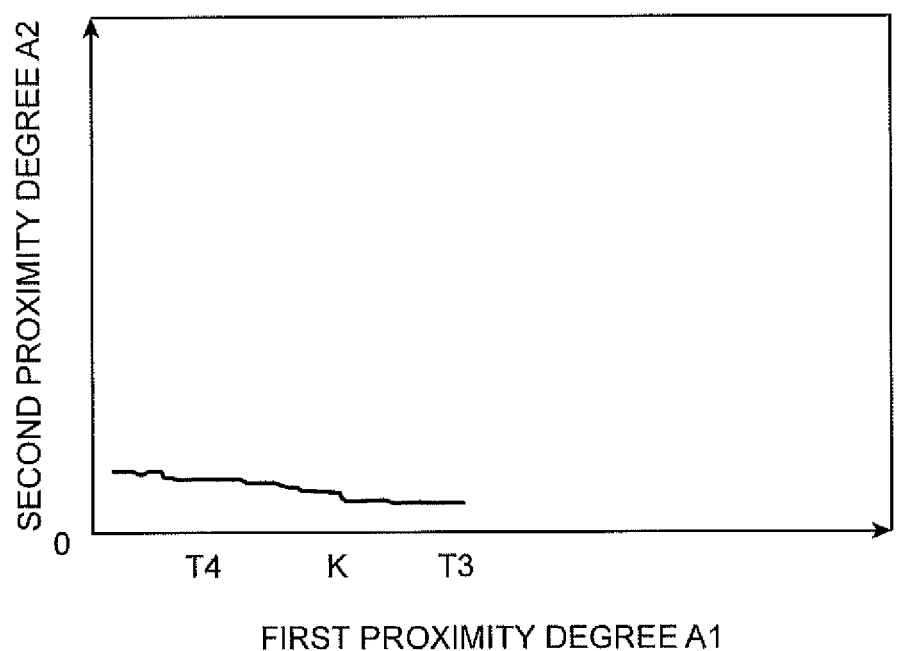
FIG. 7 is a graph illustrating changes of the first proximity degree A1 and the second proximity degree A2 in a translational state.

In addition, a change of the first proximity degree A1 and the second proximity degree A2 which are the driving indices when the encounter-state of the vehicle and the object is the translational state will be described using FIG. 7. FIG. 7 is a graph in which, in a case where the encounter-state is the translational state, the first proximity degree A1 and the second proximity degree A2 which are the driving indices are respectively calculated and the change thereof are illustrated. As illustrated in FIG. 7, even when the first proximity degree A1 decreases from T3 to T4, the second proximity degree A2 is almost not changed. Therefore, even if the vehicle approach the object in the vehicle traveling direction, the vehicle and the object almost does not approach each other in the vehicle width direction. That is, in FIG. 7, the characteristics indicating the translational state is appeared.

It is understood that there is certain regularity between the change of the driving indices in FIG. 6 and the change of the driving indices in FIG. 7. That is, in a case of the crossing state, the change of the second proximity degree A2 is large in regard with the change of the first proximity degree A1. On the other hand, in a case of the translational state, the there is almost no change of the second proximity degree A2 in regard with the change of the first proximity degree A1.

By calculating the ratio ($\Delta Y/\Delta X$) of the change ($\Delta Y$) of the second proximity degree A2 to the change ($\Delta X$) of the first proximity degree A1 based on these characteristics, and comparing the calculated ratio and the predetermined threshold value, the encounter-state of the vehicle and the object can be determined. The predetermined threshold value includes a first threshold value for determining whether or not the encounter-state is the crossing state, and a second threshold value for determining whether or not the encounter-state is the translational state. An absolute value of the first threshold value is larger than an absolute value of the second threshold value.

Whether or not the encounter-state is the crossing state is determined by the determination of whether or not the ratio ($\Delta Y/\Delta X$) of the change ($\Delta Y$) of the second proximity degree A2 to the change ($\Delta X$) of the first proximity degree A1 is equal to or larger than the first threshold value. In a case where the ratio described above is equal to or larger than the first threshold value, it is determined that the encounter-state is the crossing state. In this case, the collision avoidance assistance determination unit 18 may determine the execution of the collision avoidance assistance at the timing prior to the planned execution timing.

The first threshold value is a value in which the ratio ($\Delta Y/\Delta X$) of the change ($\Delta X$) of the first proximity degree A1 and the change ($\Delta Y$) of the second proximity degree A2 are statistically processed in the crossing state. The first threshold value may be a minimum value among the ratios acquired in multiple times by each driver under the same conditions. As described above, by obtaining the first threshold value in advance, whether or not the encounter-state is the crossing state is determined under a certain criteria.

Whether or not the encounter-state is the translational state is determined by whether or not the ratio ($\Delta Y/\Delta X$) of the change ($\Delta X$) of the first proximity degree A1 and the change ($\Delta Y$) of the second proximity degree A2 is equal to or smaller than the second threshold value. In a case where the ratio described above is equal to or smaller than the second threshold value, it is determined that the encounter-state is the translational state. In this case, the collision avoidance assistance determination unit 18 may determine not to execute the collision avoidance assistance at the timing prior to the planned execution timing.

Similar to the way of obtaining the first threshold value, the second threshold value is a value in which the ratio ($\Delta Y/\Delta X$) of the change ($\Delta X$) of the first proximity degree A1 and the change ($\Delta Y$) of the second proximity degree A2 are statistically processed in the translational state. The second threshold value may be a maximum value among the ratios acquired in multiple times by each driver under the same conditions. As described above, by obtaining the second threshold value in advance, whether or not the encounter-state is the translational state is determined under a certain criteria.

A state in which the object is stopped is treated as a particular case of the translational state. In addition, in a case where the ratio ($\Delta Y/\Delta X$) of the change ($\Delta X$) of the first proximity degree A1 to the change ($\Delta Y$) of the second proximity degree A2 is greater than the second threshold value and smaller than the first threshold value, the moving state of the object is determined to be unclear. In this case, the determination of the encounter-state is performed again.

By performing the determination of the encounter-state using the method described above, it is possible to determine the encounter-state of the vehicle and the object within a short time. In addition, since the encounter-state of the vehicle and the object can be determined in the middle of a transition of the first proximity degree A1 and the second proximity degree A2, it is possible to appropriately perform the determination at the early timing from the time of encountering with the object.

Figure 8:
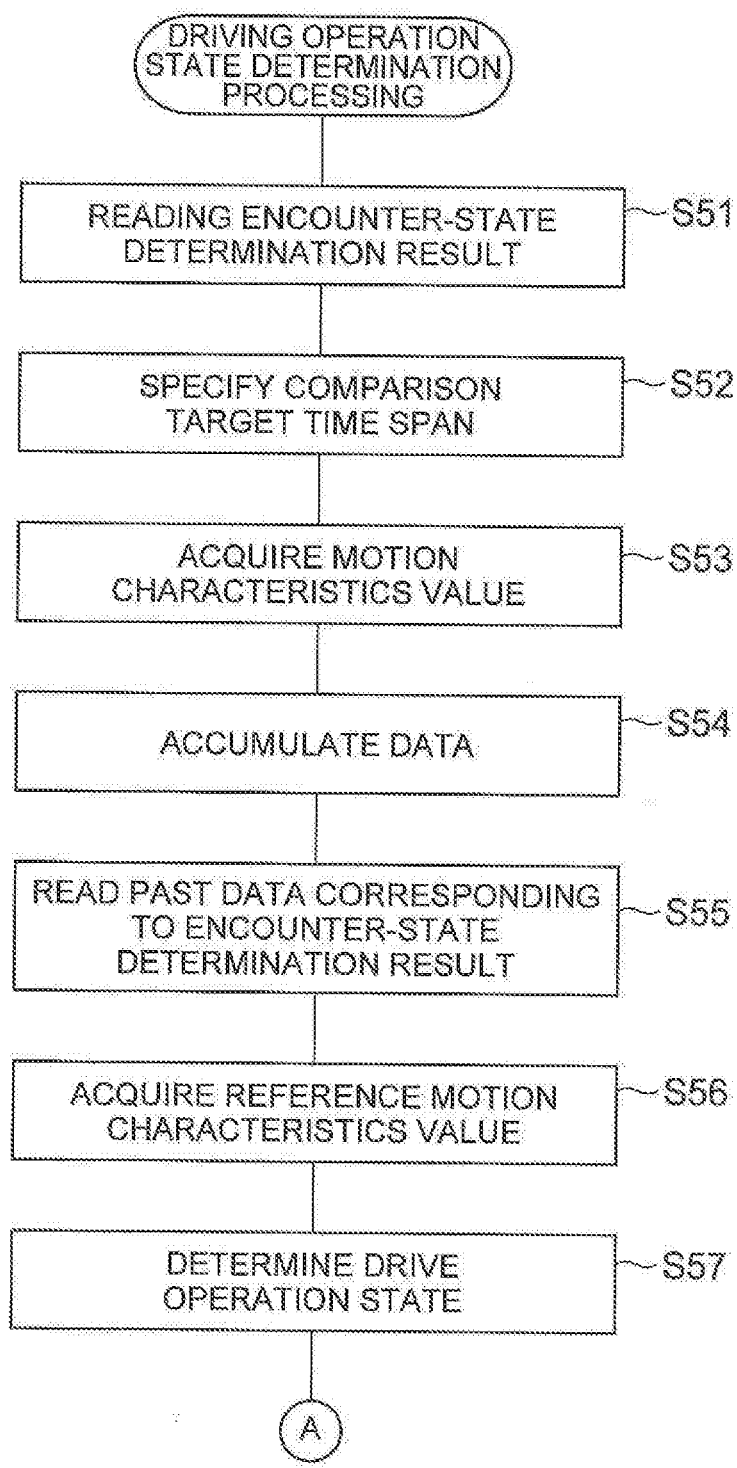
FIG. 8 is a flow chart describing driving operation state determination processing.

Next, an example of driving operation state determination processing will be described with reference to FIG. 8. FIG. 8 is a flow chart describing details of the driving operation state determination processing (S15).

First, the time span specification unit 14 and the motion characteristics value acquisition unit 15 perform the reading of the encounter-state determination result determined by the encounter-state determination unit 12 (S51).

Next, the time span specification unit 14 specifies the comparison target time span (S52). Then, the motion characteristics value acquisition unit 15 acquires the motion characteristics value obtainable from the jerk of the vehicle in the specified comparison target time span (S53). The motion characteristics value in the comparison target time span may be obtained from the jerk of the vehicle and the acceleration of the vehicle.

Next, the storage unit 16 accumulates the motion characteristics value acquired by the motion characteristics value acquisition unit 15 as the data (S54). The motion characteristics value is accumulated in the storage unit 16 in association with the encounter-state determination result. The storage unit 16 accumulates, for example, the comparison target time span in addition to the motion characteristics value.

Next, the reference motion characteristics value acquisition unit 17 performs the reading of the past data corresponding to the encounter-state determination result determined by the encounter-state determination unit 12 (S55). The past data are data stored in the storage unit 16. The past data in the present embodiment are history of the past motion characteristics values.

Next, the reference motion characteristics value acquisition unit 17 calculates the reference motion characteristics value obtained from the history of the past motion characteristics values in the comparison target time span (S56). In the present embodiment, the reference motion characteristics value acquisition unit 17 calculates the reference motion characteristics value for each encounter-state determined by the encounter-state determination unit 12 as the reference motion characteristics value.

Next, the collision avoidance assistance determination unit 18 performs the determination of the driving operation state based on the result of comparison between the motion characteristics value and the reference motion characteristics value (reference motion characteristics value for each encounter-state) (S57). For example, the collision avoidance assistance determination unit 18 determines whether or not the current driving operation state by the driver is the usual driving operation state by the driver. The determination by the collision avoidance assistance determination unit 18 described above is performed at the timing prior to the planned execution timing. STEPs S51 to S57 may be processed in arbitrary order or a plurality of STEPs within S51 to S57 may be processed in parallel.

Here, a method of determining the driving operation state in a case where a ratio (motion characteristics of the vehicle) of the jerk of the vehicle and the acceleration of the vehicle is used as the motion characteristics value when the encounter-state of the vehicle and the object is the crossing state, will be described with reference to FIG. 9 and FIG. 10.

Figure 9:
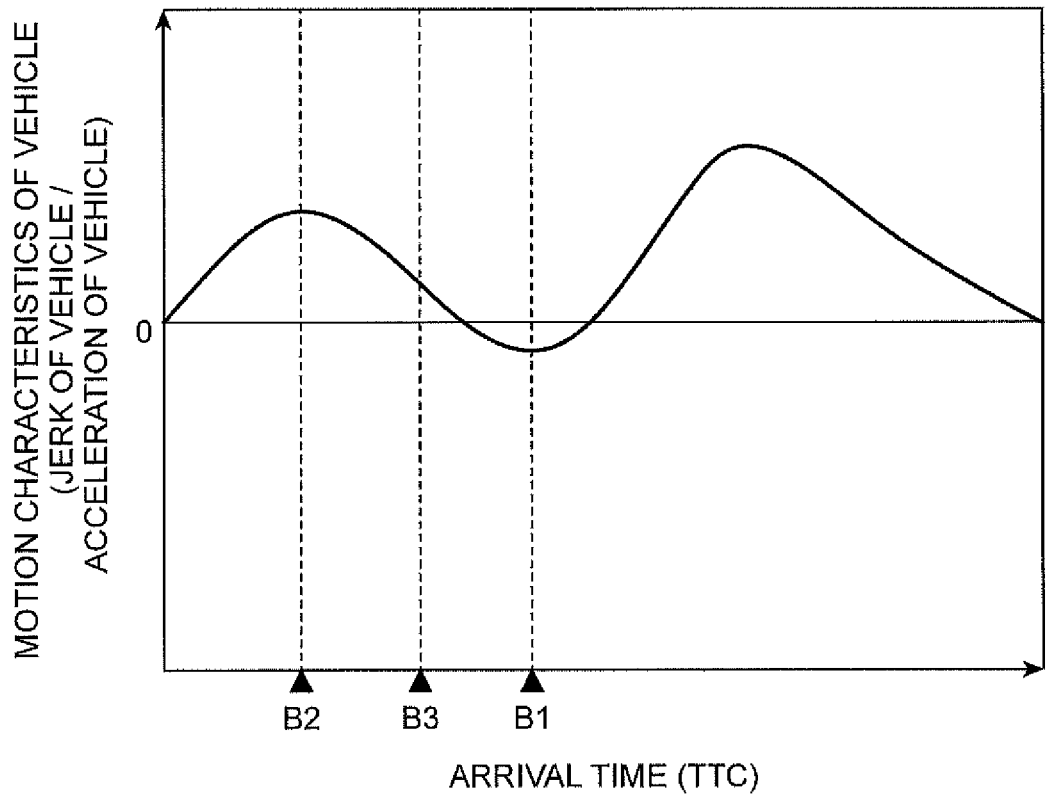
FIG. 9 is a graph illustrating an example of a temporal change of motion characteristics of the vehicle in the crossing state.

FIG. 9 is a graph illustrating an example of the temporal change of the motion characteristics of the vehicle in the crossing state. That is, FIG. 9 is a graph illustrating a current driving operation state in the crossing state. The horizontal axis indicates the arrival time (TTC) and the vertical axis indicates the motion characteristics of the vehicle. B1 indicates the planned execution timing, B2 indicates the second timing, and B3 indicates the third timing respectively. B3 is a timing prior to the planned execution timing by ΔTb. The time span set by the B2 and B3 corresponds to the comparison target time span. In order to easily perform the determination of the driving operation state, the current driving operation state may be smoothed. For example, smoothing processing is performed using a moving average of the obtained motion characteristics values of the vehicle or a median of the data in the time interval.

As illustrated in FIG. 9, the motion characteristics of the vehicle decreases from B2 through B3. The motion characteristics of the vehicle decreases also from B3 through B1. From this, it is assumed that the driver executes the driving operation in such a manner that the influence of the acceleration of the vehicle larger than that of the jerk of the vehicle from B2 through B3. That is, in the current driving operation state from B2 through B3, it is assumed that the driver does not loosen the accelerator or does not release the accelerator. In addition, in the current driving operation state from B3 through B1, it is also assumed that the situation is similar.

In addition, as illustrated in FIG. 9, the motion characteristics of the vehicle sharply increase after B1. From this, after B1, it is assumed that the driver executes the driving operation in such a manner that the influence of the jerk of the vehicle is larger than that of the acceleration of the vehicle. That is, it is assumed that the driver performs the driving operation so as to rapidly perform the braking operation after B1.

Figure 10:
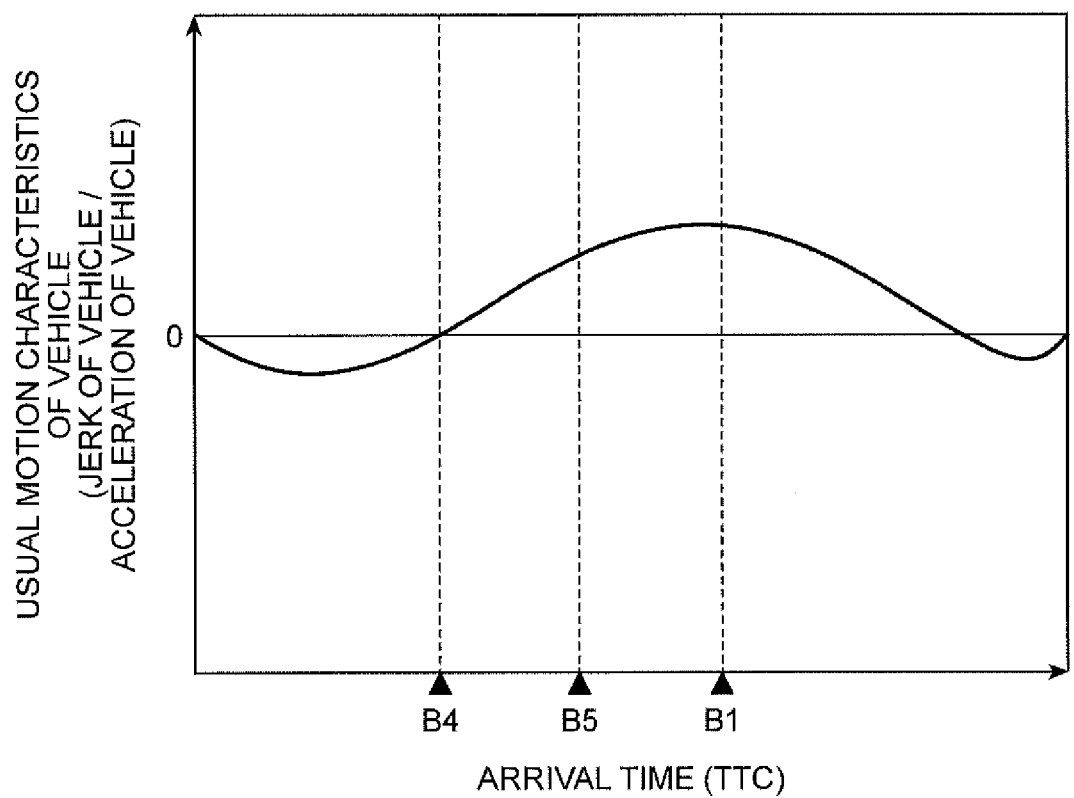
FIG. 10 is a graph illustrating an example of a temporal change of usual motion characteristics of the vehicle in the crossing state.

FIG. 10 is a graph illustrating an example of a temporal change of usual motion characteristics of the vehicle in the crossing state. That is, FIG. 10 is a graph illustrating the usual driving operation state in the crossing state. The horizontal axis indicates the arrival time (TTC) and the vertical axis indicates the usual motion characteristics of the vehicle. B1 indicates the planned execution timing, B4 indicates the second timing, and B5 indicates the third timing respectively. In a case where B1 to B5 are expressed as the arrival time TTC, B4 and B5 may be the same values as B2 and B3 respectively. In order to easily perform the determination of the driving operation state, the temporal change of the usual motion characteristics of the vehicle may be processed to be smoothed.

As illustrated in FIG. 10, the usual motion characteristics of the vehicle gradually increases after becoming zero at B4, and then, decreases after B1. From this, it is assumed that the driver executes the driving operation in such a manner that the influence of the jerk of the vehicle becomes gradually larger than that of the acceleration of the vehicle from B4 through B5. That is, it is assumed that, in the usual driving operation state from B4 through B5, the driver pays attention to the object in advance in the usual driving operation state, loosens the accelerator before B1 or releases the accelerator, and performs the driving operation so as to gradually perform the braking operation from B1. In addition, it is assumed that in the usual driving operation state from B5 through B1, it is also assumed that the situation is similar.

The determination of the driving operation state is performed by comparing the temporal change of the motion characteristics value which is the current driving operation state from B2 to B3 illustrated in FIG. 9 and the temporal change of the reference motion characteristics value (crossing state reference motion characteristics value) which is the usual driving operation state from B4 to B5 illustrated in FIG. 10 at B3 for example. The determination of the driving operation state is acquired by, for example, calculating the difference between the motion characteristics value at the arbitrary timing in the comparison target time span and the reference motion characteristics value.

By performing the determination as described above, it is determined at the timing prior to the execution of the collision avoidance assistance whether or not the current driving on which it is necessary to perform the collision avoidance is the usual driving on which it is not necessary to perform the collision avoidance assistance. Here, the timing prior to the planned execution timing corresponds to an arbitrary timing in the time spans set between B1 and B3. Therefore, it is possible to perform the determination of the execution of the collision avoidance assistance and the execution of the preliminary assistance at the earlier timing.

Figure 11:
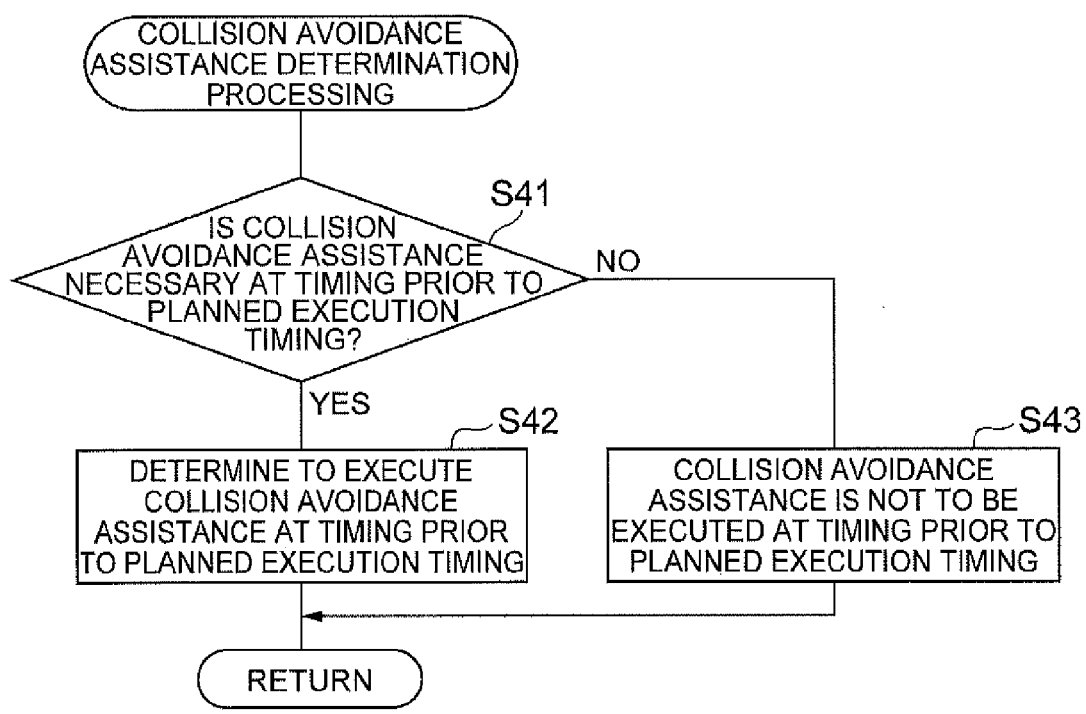
FIG. 11 is a flow chart describing collision avoidance assistance determination processing.

Next, an example of collision avoidance assistance determination processing will be described with reference to FIG. 11. FIG. 11 is a flow chart describing the collision avoidance assistance determination processing (S16) that determines whether or not to execute the collision avoidance assistance at the timing prior to the planned execution timing.

As illustrated in FIG. 11, first, the collision avoidance assistance determination unit 18 determines whether or not the collision avoidance assistance is necessary at the timing prior to the planned execution timing according to the result of the driving operation state determination processing determined in the driving operation state determination processing (S15) (S41). The determination whether or not the collision avoidance assistance is necessary at the timing prior to the planned execution timing is determined based on whether or not the deviation degree between the motion characteristics value and the reference motion characteristics value in the comparison target time span is large. Specifically, whether or not the collision avoidance assistance is necessary at the timing prior to the planned execution timing is determined based on whether or not the deviation degree between the motion characteristics value and the reference motion characteristics value in the comparison target time span is equal to or larger than the threshold value. That is, in a case where it is determined that the deviation degree between the motion characteristics value and the reference motion characteristics value in the comparison target time span is equal to or larger than the threshold value, the collision avoidance assistance determination unit 18 determines that the collision avoidance assistance is necessary at the timing prior to the planned execution timing. On the other hand, in a case where it is determined that the deviation degree between the motion characteristics value and the reference motion characteristics value in the comparison target time span is not equal to or larger than the threshold value, the collision avoidance assistance determination unit 18 determines that the collision avoidance assistance is not necessary at the timing prior to the planned execution timing.

In a case where it is determined that the collision avoidance assistance is necessary at the timing prior to the planned execution timing (YES in S41), the collision avoidance assistance determination unit 18 determines to execute the collision avoidance assistance at the timing prior to the planned execution timing (S42). Then, the collision avoidance assistance execution unit 19 executes the collision avoidance assistance for the vehicle at the timing prior to the planned execution timing. In a case where it is determined that the collision avoidance assistance is not necessary at the timing prior to the planned execution timing (NO in S41), it is determined not to execute the collision avoidance assistance at the timing prior to the planned execution timing (S43). In any a case of S42 or S43, the collision avoidance assistance for the vehicle may or may not be performed at the planned execution timing. As the collision avoidance assistance at the timing prior to the planned execution timing, at least any one of the assistances such as the braking intervention, the steering intervention, or the warning to the driver described above is performed. In addition, the timing prior to the planned execution timing is the timing close to the time when the driver usually perform the acceleration operation or the braking operation when, for example, the driver encounters the object.

According to the collision avoidance assistance device 1 and the collision avoidance assistance method in the embodiment described above, the collision avoidance assistance determination unit 18 determines whether or not to execute the collision avoidance assistance at the timing prior to the planned execution timing based on at least the result of comparison between the motion characteristics value obtained from the jerk of the vehicle and the reference motion characteristics value obtained from the history of the past motion characteristics values in the comparison target time span prior to the planned execution timing at which the collision avoidance assistance is planned to be executed. Here, the jerk of the vehicle is a parameter from which the change of the amount of motion of the vehicle caused by the OFF operation of the accelerator pedal by the driver, the ON operation of the brake pedal by the driver or the like is easily extracted, and it can be presumably recognized that the reference motion characteristics value is a value expressing the characteristics of usual driving by the driver. Therefore, it is possible to determine whether or not to execute the collision avoidance assistance at the timing prior to the planned execution timing based on whether or not the current driving characteristics of the driver is different from the usual driving characteristics of the driver. In this way, it is possible to perform the collision avoidance assistance at the earlier execution timing while suppressing the generation of the unnecessary collision avoidance assistance compared to a case of not being based on the result of comparison between the motion characteristics value and the reference motion characteristics value.

The motion characteristics value acquisition unit 15 may acquire the motion characteristics value obtainable from the jerk of the vehicle and the acceleration of the vehicle in the comparison target time span. In this way, it is possible to perform the comparison of the motion characteristics value and the reference motion characteristics value using not only the jerk of the vehicle but also considering the acceleration of the vehicle. Here, the acceleration of the vehicle is a parameter from which the change of the amount of motion of the vehicle caused by the operation of decreasing a variable speed such as the engine brake operation by the driver or the change of the amount of motion of the vehicle after the operation of the accelerator pedal or after the operation of the brake pedal can easily be extracted. Therefore, by performing the determination of collision avoidance assistance using both the jerk of the vehicle and the acceleration of the vehicle, it is possible to perform the collision avoidance assistance at the earlier execution timing while further suppressing the generation of the unnecessary collision avoidance assistance.

In addition, the motion characteristics value acquisition unit 15 may acquire the ratio of the jerk of the vehicle and the acceleration of the vehicle in the comparison target time span as the motion characteristics value. It is possible to actualize the change of the motion characteristics of the vehicle that represents the characteristics of the driving operation performed by the driver by using the ratio of the jerk of the vehicle and the acceleration of the vehicle. In this way, it is possible to perform the collision avoidance assistance at the earlier execution timing while further suppressing the generation of the unnecessary collision avoidance assistance.

In addition, in a case where the deviation degree between the motion characteristics value and the reference motion characteristics value is equal to or larger than the threshold value, the collision avoidance assistance determination unit 18 may determine to execute the collision avoidance assistance at the timing prior to the planned execution timing. In this way, it is accurately determined whether or not the current driving operation state represented by the motion characteristics value is different from the usual driving operation state represented by the motion characteristics value. Therefore, it is possible to perform the collision avoidance assistance at the earlier execution timing while further suppressing the generation of the unnecessary collision avoidance assistance.

In addition, the encounter-state determination unit 12 that determines the encounter-state between the vehicle and the object is further included, and the encounter-state determination unit 12 may determine whether the encounter-state of the object with the vehicle is the crossing state or the translational state based on the first proximity degree obtained by dividing the relative distance between the vehicle and the object in the traveling direction of the vehicle by the relative speed between the vehicle and the object and the second proximity degree obtained by dividing the relative distance between the vehicle and the object in the direction intersecting the traveling direction of the vehicle by the relative speed between the vehicle and the object, and the collision avoidance assistance determination unit 18 may determine whether or not to execute the collision avoidance assistance at the timing prior to the planned execution timing based on the result of comparison between the motion characteristics value and the reference motion characteristics value for each encounter-state in the comparison target time span, obtainable from the history of the past motion characteristics values in each encounter-state. It is considered that the temporal change of the motion characteristics value in a case where the encounter-state determined by the encounter-state determination unit 12 is the translational state is different from that in a case where the encounter-state is the crossing state. Therefore, as the target of comparison with the motion characteristics value, by using the motion characteristics value for each encounter-state in the same encounter-state as the motion characteristics value, it is possible to improve the accuracy of the determination of whether or not to execute the collision avoidance assistance at the timing prior to the planned execution timing.

In addition, in a case where the encounter-state is the crossing state, the collision avoidance assistance determination unit 18 may determine whether or not to execute the collision avoidance assistance at the timing prior to the planned execution timing based on the result of comparison between the motion characteristics value and the crossing reference motion characteristics value in the comparison target time span obtainable from the history of the past motion characteristics values in a case where the encounter-state is the crossing state. It is considered that the temporal change of the motion characteristics value in a case where the encounter-state determined by the encounter-state determination unit 12 is the crossing state is larger than that in a case where the encounter-state is the translational state. Therefore, in a case where the encounter-state is the crossing state, by using the crossing state reference motion characteristics value as the motion characteristics value for each encounter-state, it is possible to improve the accuracy of the determination of whether or not the collision avoidance assistance to be executed at the timing prior to the planned execution timing.

The collision avoidance assistance device in the present invention is not limited to that in the embodiment described above. For example, the reference motion characteristics value is not necessarily acquired by the reference motion characteristics value acquisition unit 17. In this case, the reference motion characteristics value may be acquired by the motion characteristics value acquisition unit 15 or may be calculated by and stored in the storage unit 16.

In addition, as the reference motion characteristics value, not only the reference motion characteristics value for each encounter-state but also the reference motion characteristics value in the comparison target time span obtainable from the history of the past motion characteristics values regardless of the encounter-state determined by the encounter-state determination unit, may be used. In this case, the collision avoidance assistance determination unit 18 may determine whether or not to execute the collision avoidance assistance for the vehicle at the timing prior to the planned execution timing based on the result of comparison between the motion characteristics value acquired by the motion characteristics value acquisition unit 15 and the reference motion characteristics value in the comparison target time span obtainable from the history of the past motion characteristics values without necessarily determining the encounter-state.

REFERENCE SIGNS LIST 1 collision avoidance assistance device
10 ECU
11 information processing unit
12 encounter-state determination unit
13 planned execution timing determination unit
14 time span specification unit
15 motion characteristics value acquisition unit
16 storage unit
17 reference motion characteristics value acquisition unit
18 collision avoidance assistance determination unit
19 collision avoidance assistance execution unit
21 object detection unit
22 HMI
23 actuator

The invention claimed is:

1. A collision avoidance assistance device configured to execute collision avoidance assistance for a vehicle with respect to an object around the vehicle, the collision avoidance assistance device comprising:
an object detection unit configured to detect the object;
a planned execution timing determination unit configured to determine a planned execution timing at which the collision avoidance assistance is planned to be executed, based on the result of detection by the object detection unit;
a motion characteristics value acquisition unit configured to acquire a motion characteristics value obtainable from at least a jerk of the vehicle in a comparison target time span which is a predetermined time span later than a detection timing at which the object detection unit detects the object and prior to the planned execution timing; and
a collision avoidance assistance determination unit configured to determine whether or not to execute the collision avoidance assistance at the timing prior to the planned execution timing based on the result of comparison between the motion characteristics value acquired by the motion characteristics value acquisition unit and a reference motion characteristics value in the comparison target time span obtainable from a history of the past motion characteristics values.

2. The collision avoidance assistance device according to claim 1,
wherein the motion characteristics value acquisition unit is configured to acquire the motion characteristics value obtainable from the jerk of the vehicle and the acceleration of the vehicle in the comparison target time span.

3. The collision avoidance assistance device according to claim 2,
wherein the motion characteristics value acquisition unit is configured to acquire a ratio of the jerk of the vehicle and the acceleration of the vehicle in the comparison target time span as the motion characteristics value.

4. The collision avoidance assistance device according to claim 1,
wherein, in a case where a deviation degree between the motion characteristics value and the reference motion characteristics value is equal to or larger than a threshold value, the collision avoidance assistance determination unit is configured to determine to execute the collision avoidance assistance at the timing prior to the planned execution timing.

5. The collision avoidance assistance device according to claim 1, further comprising:
an encounter-state determination unit configured to determine an encounter-state between the vehicle and the object,
wherein the encounter-state determination unit is configured to determine whether the encounter-state of the object with respect to the vehicle is a crossing state or a translational state based on a first proximity degree which is obtained by dividing a relative distance between the vehicle and the object in the traveling direction by a relative speed between the vehicle and the object and a second proximity degree which is obtained by dividing the relative distance between the vehicle and the object in the direction intersecting the traveling direction of the vehicle by a relative speed between the vehicle and the object, and
wherein the collision avoidance assistance determination unit is configured to determine whether or not to execute the collision avoidance assistance at the timing prior to the planned execution timing based on the result of comparison between the motion characteristics value acquired by the motion characteristics value acquisition unit and the reference motion characteristics value for each encounter-state in the comparison target time span obtainable from the history of the past motion characteristics values in the encounter-state determined by the encounter-state determination unit.

6. The collision avoidance assistance device according to claim 5, wherein, in a case where the encounter-state is the crossing state, the collision avoidance assistance determination unit is configured to use the crossing state reference motion characteristics value as the reference motion characteristics value for each encounter-state, which is obtainable from the history of the past motion characteristics values when the encounter-state determination unit determines that the encounter-state is the crossing state in the comparison target time span.

7. A collision avoidance assistance method for executing collision avoidance assistance for a vehicle with respect to an object around the vehicle, the collision avoidance assistance method comprising:

an object detection step of detecting the object;

a planned execution timing determination step of determining a planned execution timing at which the collision avoidance assistance is planned to be executed, based on the result of detection in the object detection step;

a motion characteristics value acquisition step of acquiring a motion characteristics value obtainable from a jerk of the vehicle in a comparison target time span which is a predetermined time span later than a detection timing at which the object is detected in the object detection step and prior to the planned execution timing determined in the planned execution timing determination step; and a collision avoidance assistance determination step of determining whether or not to execute the collision avoidance assistance at the timing prior to the planned execution timing based on the result of comparison between the motion characteristics value acquired in the motion characteristics value acquisition step and a reference motion characteristics value in the comparison target time span obtainable from a history of the motion characteristics values.

* * * * *